(No Model.)

N. O. LINDSTROM & O. P. CUMMINGS.
APPARATUS FOR CONTROLLING ELECTRIC ELEVATORS.

No. 530,541. Patented Dec. 11, 1894.

Witnesses
Edward Thorpe
O. C. Grigg

Inventors
Nils O. Lindstrom
Orrie P. Cummings
By their Attorneys

UNITED STATES PATENT OFFICE.

NILS O. LINDSTROM, OF UNION COURSE, AND ORRIE P. CUMMINGS, OF BROOKLYN, ASSIGNORS TO THE A. B. SEE MANUFACTURING COMPANY, OF BROOKLYN, NEW YORK.

APPARATUS FOR CONTROLLING ELECTRIC ELEVATORS.

SPECIFICATION forming part of Letters Patent No. 530,541, dated December 11, 1894.

Application filed September 20, 1894. Serial No. 523,547. (No model.)

*To all whom it may concern:*

Be it known that we, NILS O. LINDSTROM, residing at Union Course, in the county of Queens, and ORRIE P. CUMMINGS, residing at Brooklyn, in the county of Kings, State of New York, citizens of the United States, have invented certain new and useful Improvements in Apparatus for Controlling Electric Elevators, of which the following is a specification.

This invention relates to controllers for electric elevators.

The object of the invention is to enable an elevator to be controlled in its movements by a simple switch mounted on the car, and to enable the starts and stops to be rendered gradual by simple and effective means.

In carrying out our invention we provide at the point where the actuating electric motor is located a small auxiliary motor whose direction of motion is controlled by the switch on the car, and utilize this motor to operate a circuit-closing and reversing switch for the main motor. We also provide the auxiliary motor with a circuit-interrupting device, by which a reversal of its actuating current will be impossible until its armature returns to its normal position, thus rendering it impossible for the elevator boy to interfere with its proper directions of movement by suddenly shifting the elevator switch from one contact to the other. We preferably provide the auxiliary motor with two field-magnet circuits wound in opposite directions in order to reverse the field poles, these circuits terminating in the controlling contacts on the elevator car. The armature circuit might, however, be reversed in lieu of the field-magnet circuits.

The several features of novelty of the invention will be more particularly hereinafter described, and will be definitely indicated in the claims appended to this specification.

Figure 1:
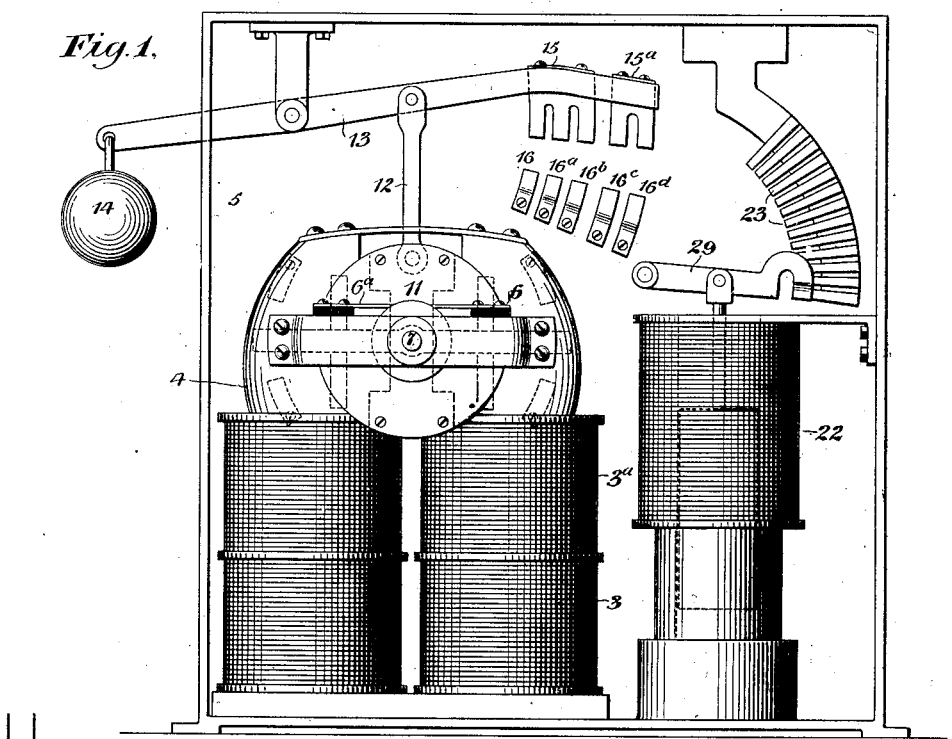
Figure 2:
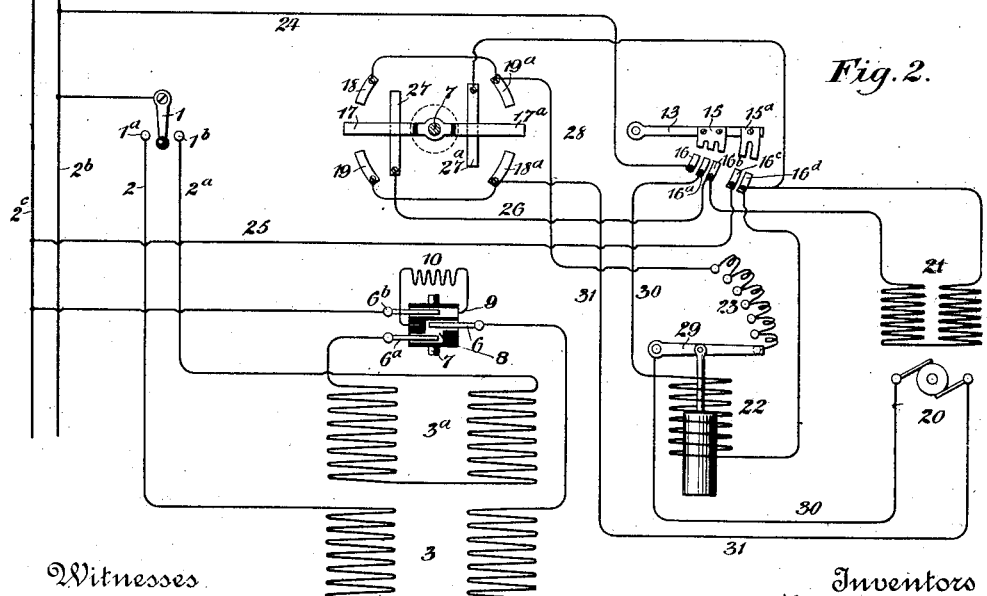

In the accompanying drawings, which illustrate the invention, Figure 1 is an end elevation of an apparatus embodying our improvements, and Fig. 2 is a diagram showing the circuit connections of the several parts.

On an elevator car is mounted a switch 1, see Fig. 2, provided with two controlling contacts $1^a$, $1^b$ leading by conductors 2, $2^a$ to field-magnet coils 3, $3^a$ of a small motor 4 mounted in the basement or other part of a building where the operating elevator is located.

The motor 4 may be mounted on the rear of the box 5 containing the resistance coil commonly employed to graduate the starting or stopping of the motor.

The resistance coils are not seen in the drawings, being behind a partition in box 5.

The conductors 2, $2^a$ and $2^b$ leading from the elevator may be grouped in a flexible cable in a manner well understood.

The field-magnet coils 3, $3^a$ terminate in brushes 6, $6^a$. A third brush $6^b$ connects with one of the mains $2^c$ of the system of electric supply. The brushes 6, $6^a$, $6^b$ bear upon conducting rings or collars mounted upon but insulated from the shaft 7 of the auxiliary motor 4. The ring 9 upon which the brush $6^b$ bears is continuous so as to maintain uninterrupted contact with the brush. The ring 8 upon which brushes 6, $6^a$ bear has its two conducting surfaces in different planes and so arranged with reference to the brushes that in its normal position both brushes will be in engagement, but upon motion of the disk to the right or left one of the brushes will be cut out and the other will maintain its contact.

The armature circuit 10 of the auxiliary motor has its terminals connected with the rings 8 and 9.

It will thus be seen that if the switch 1 be thrown upon contact $1^a$, the field coil 3 will be connected in circuit through the brush 6, contact ring 8, armature 10, contact ring 9, and brush $6^b$; whereas, if the switch rest upon contact $1^b$, the field-magnet coil $3^a$ will be brought into circuit through brush $6^a$, contact ring 8, armature 10, contact ring 9 and brush $6^b$; and since the field coils are oppositely wound the armature of the motor will be shifted in opposite directions in the two cases.

We preferably employ a "Siemens I" armature as being simpler and cheaper to construct, which is shown at 11 in Fig. 1.

It will be noted that the armature circuit is non-commutated, that is to say, the polar axis of the armature does not shift with respect to the geometrical axis, and that the polar axis stands normally transverse to the field of force and is ready to shift in either direction according to the direction of current as supplied by the controlling switch. The armature when in action will shift through a quarter turn and be held rigidly within the grip of the field-magnets until the circuit is opened, when the counter-weight will restore it to its normal position.

The armature is connected by a link 12 with a switch arm 13 journaled upon a bracket and provided with a counter-weight 14. The switch arm carries at one extremity insulated brushes 15, 15$^a$, which, when brought upon contacts 16, 16$^a$, 16$^b$, 16$^c$, 16$^d$ close the various controlling circuits of the main electric motor.

The circuit connections will be understood from an examination of Fig. 2. Upon the shaft 7 of the auxiliary motor is mounted a reversing switch provided with insulated arms 17, 17$^a$ co-operating with two sets of contacts 18, 18$^a$, 19, 19$^a$ connecting with the armature 20 of the main operating motor. The field-magnet 21 of this motor is connected in shunt relation to the armature.

The contact 16 of the circuit-closing switch is connected with one of the electric supply mains and the contact 16$^c$ with the motor. A speed regulating solenoid 22 has its terminals connected with contacts 16$^a$ and 16$^d$. The field-magnet and armature circuits 21 are connected with contacts 16$^b$ and 16$^d$, the former being directly connected therewith and the latter through the reversing switch and rheostat 23.

The operation of the apparatus will now be understood. In starting, the switch 1 is thrown to contact 1$^a$ or 1$^b$, thus energizing the auxiliary motor 4 and causing its armature to undergo a partial rotation to the right or to the left, thus shifting downwardly the link 12 and causing the brushes 15, 15$^a$ to engage the group of contacts 16 to 16$^d$. Simultaneously with this operation the arms 17, 17$^a$ of the reversing switch will be shifted into engagement with contacts 18, 18$^a$ or 19, 19$^a$ and the motor circuit will be closed as follows: Assume the reversing switch to be shifted, say, to the right, and to bring arms 17, 17$^a$ into engagement with contacts 18, 18$^a$, current will then flow from the main 2$^b$ by conductor 24 to contact 16, and there divide into several branches, one passing to contact 16$^a$, resistance actuating solenoid 22, contact 16$^d$, across brush 15$^a$ to contact 16$^c$ and thence back by conductor 25 to the return supply main. Another branch passes across brush 15 to contact 16$^b$, thence through the field-magnet circuit 21 of the main motor to contact 16$^d$, across brush 15$^a$ to contact 16$^c$ and back by conductor 25 to the return main. A third branch passes across brush 15 to contact 16$^b$, thence by conductor 26 to contact plate 27 of the reversing switch, thence across arm 17 of the switch to contact 18, thence by conductor 28 to resistance 23, thence by the resistance arm 29 and conductor 30 to the armature 20, thence by conductor 31 to contact 18$^a$ of the reversing switch, across arm 17$^a$ to contact plate 27$^a$, thence to contact 16$^d$ through brush 15$^a$ to contact 16$^c$ and back by conductor 25 to the return main. If, however, contact 1$^a$ on the elevator had been brought into engagement with the switch 1, the field-magnet coil 3 would have shifted the armature of the auxiliary motor to the left and brought contacts 19 and 19$^a$ of the reversing switch into active relation to the circuit, thus reversing the armature circuit of the main motor, since the two terminals of this circuit connect with the pairs of contacts 18, 18$^a$ or 19, 19$^a$, and as the long contacts 27, 27$^a$ form the terminals of the supply leads current will be directed through the armature 20 in opposite directions accordingly as the arms 17, 17$^a$ are shifted into engagement with one or the other of these pairs of contacts. The simultaneous operation of the circuit-closing arm 13 and the reversing switch causes a rupture of the circuit at several distinct points and thus reduces the sparking. So, also, the multiple contacts of the brushes 15, 15$^a$ sub-divides the spark. When the circuit is closed on solenoid 22 its core is gradually raised and the resistance cut out of the armature circuit so as to accelerate the motor speed.

We are aware that independent solenoids have been employed for shifting a reversing switch. A motor, however, offers several advantages over the solenoids. It permits a long range of movement and a uniform torque and pull which cannot readily be attained by means of a solenoid without an expensive construction.

It will be seen that the circuit-changer controlled by the arm 7 of the auxiliary motor cuts out the brush 6 or the brush 6$^a$ according to the direction of its movement after the motor starts into action. Thus in the normal condition of the apparatus the motor is ready to shift in either direction, but once movement has been effected it becomes impossible for the elevator boy to reverse the current through the field until the arm has been restored to its normal position by the counter-weight 14. Thus a sudden reversal of the elevator with full current on is guarded against, if by carelessness the elevator boy should suddenly shift the switch from one contact to the other.

Having thus described our invention, what we claim as new, and desire to secure by Letters Patent, is—

1. A controller for an electric elevator comprising an auxiliary electric motor having a non-commutated armature circuit, the polar axis of the armature normally lying transverse to the field of force, a controlling switch on the elevator car for reversing the direction of the armature torque, and reversing switches in the main motor circuit attached by the auxiliary motor.

2. A controller for an electric elevator comprising a controlling switch mounted on the car, an auxiliary motor for operating the controlling switches of the main motor, the auxiliary motor being provided with a non-commutated armature circuit and with indpendent reversely wound coils on one of its members connecting respectively with different points of the controlling switch.

3. The combination with the main electric motor of an auxiliary motor for controlling its direction of movement, a controlling switch for changing the direction of movement of the auxiliary motor, independent reversely-wound field-magnet coils for the auxiliary motor, and a circuit-changer normally holding both field-magnet coils in operative relation to the motor terminals but adapted to cut one out of circuit after the motor has been actuated.

4. The combination of a main electric motor, an auxiliary motor adjacent thereto for controlling its direction of movement, a distant controlling switch and circuit connections for reversing the auxiliary motor, a circuit-changer for opening one branch of the controlling circuit after the auxiliary motor has been actuated, and means for normally holding both branches in operative relation to the controlling switch.

In testimony whereof we have hereunto subscribed our names.

NILS O. LINDSTROM.
ORRIE P. CUMMINGS.

Witnesses:
ALONZO B. SEE,
F. SCHENCK.